United States Patent [19]
Fukuzawa et al.

[11] Patent Number: 5,283,698
[45] Date of Patent: Feb. 1, 1994

[54] IMAGE READING APPARATUS

[75] Inventors: Nobumasa Fukuzawa, Yokohama; Akiyoshi Kimura, Kawasaki, both of Japan

[73] Assignee: Canon Kabushiki Kaisha, Tokyo, Japan

[21] Appl. No.: 863,782

[22] Filed: Apr. 6, 1992

[30] Foreign Application Priority Data

Apr. 8, 1991 [JP] Japan .................................. 3-103127
Jul. 12, 1991 [JP] Japan .................................. 3-198927
Nov. 7, 1991 [JP] Japan .................................. 3-321366

[51] Int. Cl.$^5$ ............................................ G02B 26/02
[52] U.S. Cl. ....................................... 359/896; 355/55; 382/65
[58] Field of Search ............... 359/227, 230, 232, 205, 359/209, 210, 196, 683, 896; 356/233; 355/55, 56; 382/47, 65; 250/237 R, 208.1

[56] References Cited

U.S. PATENT DOCUMENTS

| | | | |
|---|---|---|---|
| 4,653,904 | 3/1987 | Imamura | 355/68 |
| 5,060,283 | 10/1991 | Shiraishi | 359/232 |
| 5,173,599 | 12/1992 | Setani | 250/208.1 |

FOREIGN PATENT DOCUMENTS

| | | |
|---|---|---|
| 62-43965 | 2/1987 | Japan . |
| 63-63275 | 3/1988 | Japan . |
| 259705 | 2/1990 | Japan . |

Primary Examiner—Bruce Y. Arnold
Assistant Examiner—James Phan
Attorney, Agent, or Firm—Fitzpatrick, Cella, Harper & Scinto

[57] ABSTRACT

There is disclosed an image reading apparatus in which the scanning optical system having a slit is caused to scan in a short-side direction of the slit, and light passed through the slit and reflected from or transmitted through an original is guided to a solid-state image pickup element through an optical image forming element so that the image is formed on the solid-state image pickup element and is read. In the apparatus, opening portions for detecting a shift in relative positional relationship between the slit and the solid-state image pickup element are formed in both end portions of the slit in its longitudinal direction corresponding to a portion other than an effective image region of the solid-state image pickup element.

22 Claims, 10 Drawing Sheets

IMAGE READING APPARATUS

BACKGROUND OF THE INVENTION

1. Field of the Invention

The present invention relates to a digital image reading apparatus for reading an original image using a solid-state image pickup element such as a charge-coupled device (to be abbreviated to as a CCD hereinafter) and, more particularly, to adjustment of, e.g., optical characteristics in a digital image apparatus.

2. Related Background Art

In a conventional slit exposure type image reading apparatus using a line sensor such as a CCD, most adjustment methods are performed by using jigs in the production line.

Figures 1, 2:
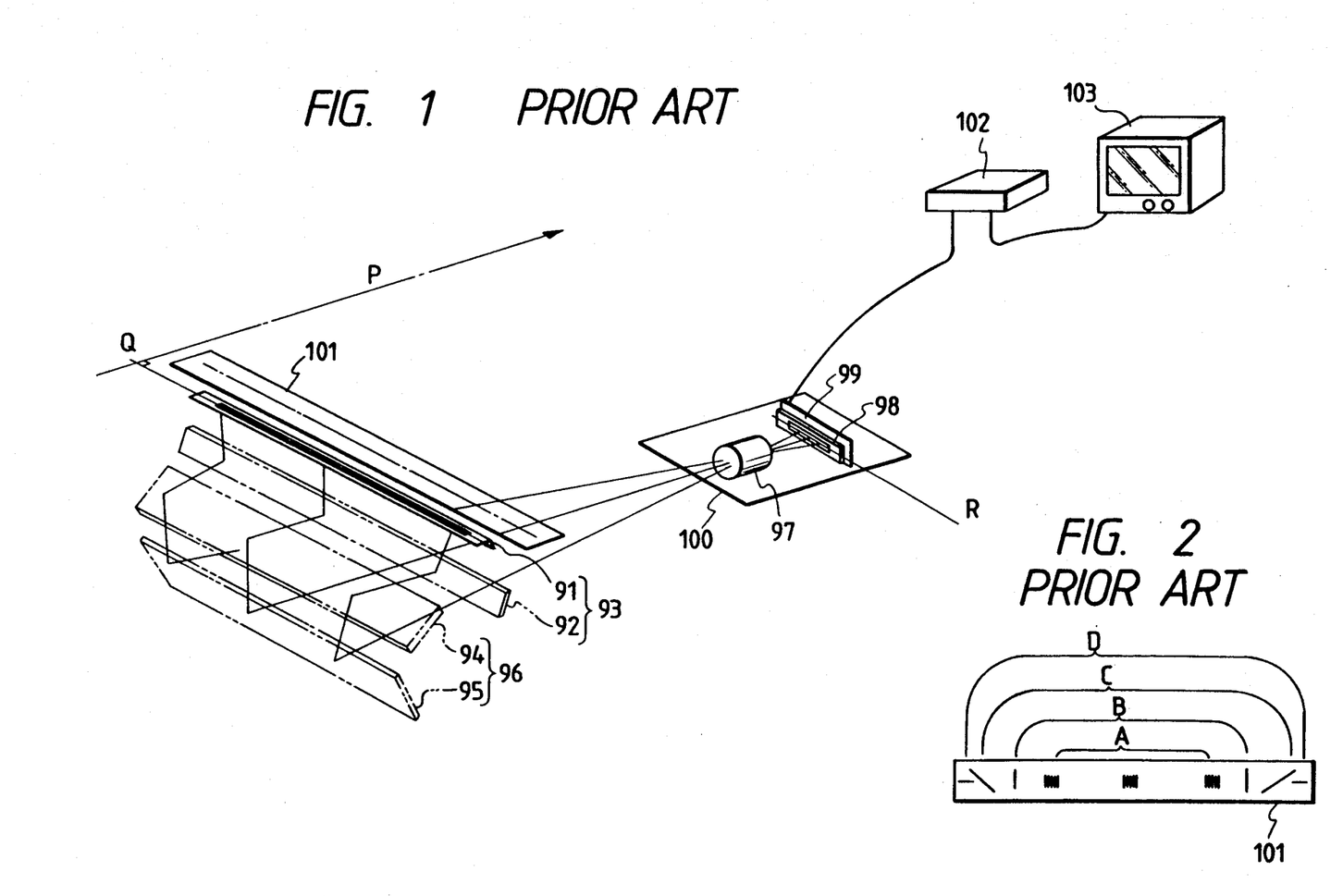
FIG. 1 is a schematic view showing the arrangement of a conventional image reading apparatus, and an adjustment method of optical characteristics.
FIG. 2 is a plan view showing the arrangement of a jig chart.

A conventional adjustment method will be described below with reference to FIGS. 1 and 2. In FIG. 1, optical elements for guiding an original image to a CCD mainly include a full-speed mirror unit 93 consisting of a slit 91, a first mirror 92, and an illumination device (not shown), a half-speed mirror unit 96 consisting of second and third mirrors 94 and 95, and an image forming unit 100 consisting of a focusing lens 97 for focusing an original image on the CCD at a reduced scale, a CCD 98, and a CCD driver 99.

In adjustment, points to be noticed are not only fundamental points regarding the optical element such as the magnification, resolving power of a lens, and the like, but also adjustment items inherent to slit exposure. The inherent items include right-angle precision of a central line Q of the slit 91 with respect to the scanning direction (a direction P in FIG. 1) of the full-speed mirror unit 93, parallelism between the central line Q of the slit and a longitudinal axis R of the CCD 98, and coincidence (to be referred to as synchronism adjustment hereinafter) between the central line Q of the slit and the longitudinal axis R of the CCD in the short-side direction of the slit through the optical elements.

In the adjustment method in the production line, a jig chart 101 shown in FIG. 2 is held at the position of a contact glass (not shown), and is exposed from the back surface side to form an image of the jig chart 101 on the CCD 98.

In this case, the following method is normally employed. CCD output signals are processed by a personal computer 102, so that the resolving power is adjusted using a portion A on the chart 101, the magnification is adjusted based on the interval of a portion B, the synchronism adjustment is performed based on a tapered chart C, and the right-angle adjustment is performed based on a portion D, while monitoring a monitor 103.

However, in the prior art, when one of optical elements constituting an optical path for focusing original reflection light onto a CCD by a focusing lens through a plurality of mirrors must be replaced due to some trouble on the market, since there is no jig for the production line, it is difficult to perform adjustment unless the jig chart 101 (including back surface exposure means), the processing personal computer 102, the monitor 103, and the like can be used. For this reason, a portion to be adjusted must be searched little by little while observing images. Thus, maintenance on the market is not considered upon design.

SUMMARY OF THE INVENTION

The present invention has been made to solve the conventional problems, and has as its object to provide an image reading apparatus, which can easily and precisely realize adjustment of the above-mentioned optical arrangement characteristics, especially, right-angle adjustment and synchronism adjustment, which are not easily judged based on an output image without requiring a special jig.

In order to achieve the above object, according to the present invention, an image reading apparatus, which scans a scanning optical system having a slit in a short-side direction of the slit, and focuses light, which is reflected by or transmitted through an original, and passes through the slit, onto a solid-state image pickup element through an optical image-forming element to read an original image, is characterized in that opening portions for detecting a shift in relative positional relationship between the slit and the solid-state image pickup element are formed in the two end portions of the slit in its longitudinal direction corresponding to a portion other than an effective image region of the solid-state image pickup element.

DETAILED DESCRIPTION OF THE PREFERRED EMBODIMENTS

The preferred embodiments of the present invention will be described in detail hereinafter with reference to the accompanying drawings.

Figure 3:
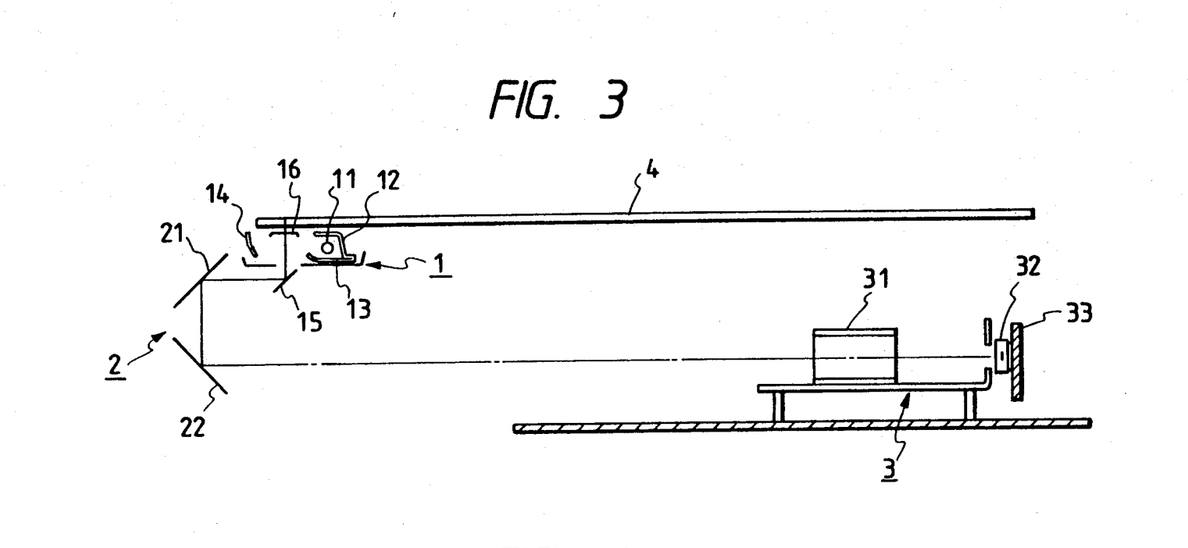
FIG. 3 is a schematic sectional view showing the arrangement of an image reading apparatus according to the first embodiment of the present invention.
Figure 4:
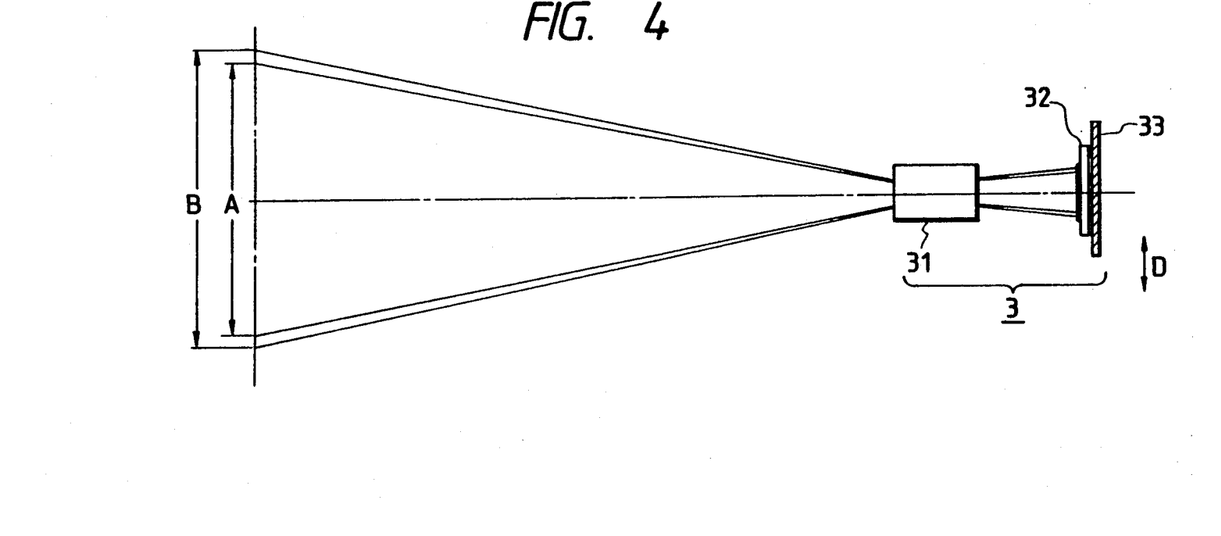
FIG. 4 is a schematic exploded plan view showing the optical path arrangement of the image reading apparatus shown in FIG. 3.

FIG. 3 is a schematic sectional view showing the arrangement of an image reading apparatus adopting the first embodiment of the present invention, and FIG. 4 is a schematic exploded plan view showing the optical path arrangement of the apparatus shown in FIG. 3.

In FIG. 3, a full-speed mirror unit 1 comprises an illumination lamp 11 for illuminating an original, reflection hats 12, 13, and 14, a first mirror 15, and a slit 16 for shielding excessive light. A half-speed mirror unit 2 comprises second and third mirrors 21 and 22. An image forming unit 3 comprises a focusing lens 31, a CCD 32, and a CCD driver 33. An original placed on an original table glass 4 is optically scanned by the full-speed mirror unit 1. Light reflected by an original, and passing through the slit 16 is guided to the image forming unit 3 through the second and third mirrors 21 and 22 of the half-speed mirror unit 2, and is focused on the CCD 32.

The slit 16 has an opening, which is elongated in the aligning direction of picture elements as compared to a direction perpendicular to the aligning direction of the picture elements of the CCD 32.

FIG. 4 shows the longitudinal direction of the optical path shown in FIG. 3. A width indicated by A corresponds to a maximum original reading width (about 300 mm). In this embodiment, the CCD 32 reads an original at 400 dpi (dots/inch), and has 5,000 picture elements in its longitudinal direction. Therefore, on an original, the CCD 32 can read an image having a width of 317.5 mm (=5,000×25.4/400). In practice, the picture elements at the two end portions of the CCD 32 have a sufficient margin even in consideration of a positional error in a direction of an arrow D in FIG. 4.

Figure 5:
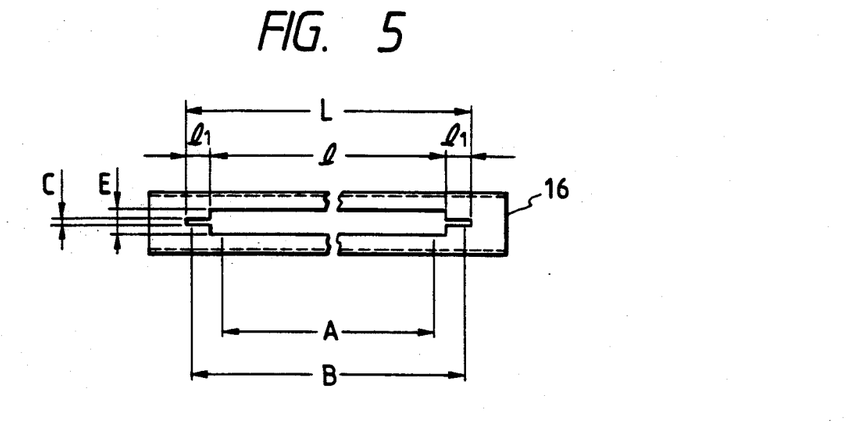
FIG. 5 is a plan view of a slit of the image reading apparatus shown in FIG. 3.

FIG. 5 is a plan view of the slit 16 explained with reference to FIG. 3. As shown in FIG. 5, the slit 16 is formed with an opening having a wider area 1×E (E is about 0.5 to 10 mm) than the width corresponding to the maximum original reading width A. A superfine slit having a length l1 and a width C (C is about 10μ to 1 mm) is formed at the center of each of the two end portions of the opening. At this time, a total opening length L (L=1+2l1) of the slit 16 is formed to be larger than the width corresponding to a readable width B of the CCD 32.

Figure 6:
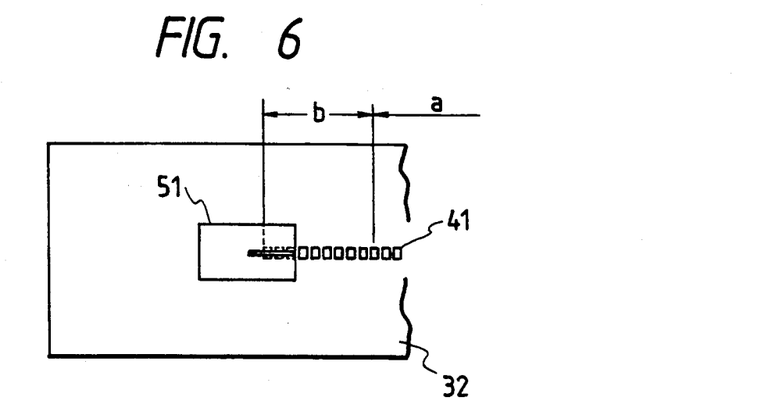
FIG. 6 is a plan view showing principal part of a CCD.
Figure 7:
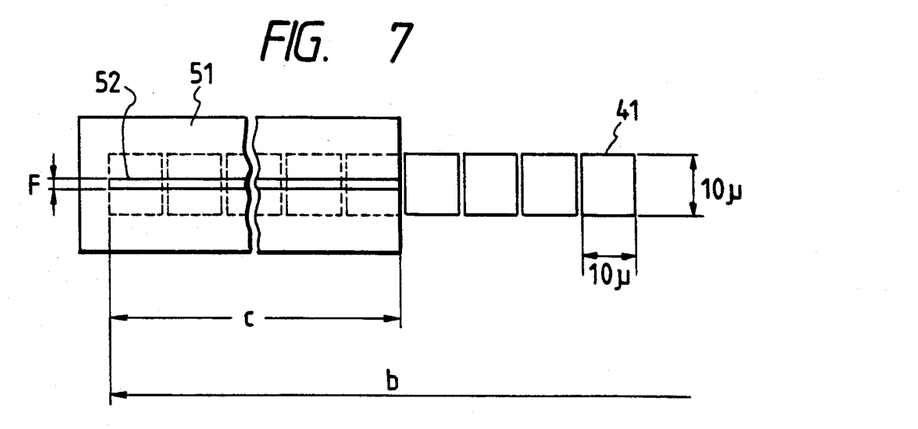
FIG. 7 is an enlarged view of FIG. 6.

FIG. 6 is a plan view showing one end portion of the CCD, 32, and FIG. 7 is an enlarged view of FIG. 6. In FIG. 6, one reading picture element chip 41 of the CCD normally has a size of 10 μm². In association with the focusing lens 31, a light-receiving area corresponding to the maximum original reading width A is a portion a, and surplus picture elements b are present outside the light-receiving area a (at the two end portions). Of the surplus picture elements b, a masking member 51 is provided on picture elements in an area c, and a slit 52 having a width F is formed at the central portion of the masking member 51, so that no light can be incident on the picture elements in the area c unless light becomes incident through the slit 52 having the width F. The width F of the slit is determined based on precision required after adjustment, and the width C of the slit 16 arranged near an original.

In the above-mentioned arrangement, an adjustment method will be explained below. Since the superfine portions 11 of the slit 16 arranged near an original are arranged to define a width larger than the width B corresponding to all the picture elements of the CCD 32, as shown in FIG. 5, light passing through the superfine portions 11 of the slit 16 is incident on the masking portion c arranged at the two end portions of the CCD 32.

In actual adjustment, blank paper is placed on the original table glass 4, and the illumination lamp 11 is turned on. The outputs from the CCD 32 are input through the CCD driver 33 normally incorporated in the reading apparatus, and the outputs from the picture elements c of the masking members 51 in FIG. 7 are monitored. In a monitoring method, in factory adjustment, as shown in FIG. 1, the outputs from the CCD driver 33 can be processed by an external personal computer, and can be displayed on a CRT. However, when the focusing unit 3, the full-speed mirror unit 1, or the half-speed mirror unit 2 is replaced on the market, the image reading apparatus is set in an adjustment mode. In this mode, when light of a predetermined light amount can be incident on the picture elements c in the masking members 51, an LED on an operation unit of the image reading apparatus is turned on, thus allowing adjustment of the relative positional relationship between the CCD 32 and the slit 16.

Figure 8:
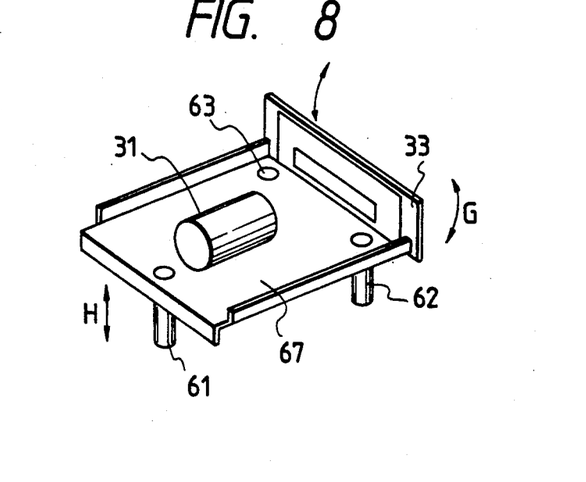
FIG. 8 is a perspective view of a focusing unit.
Figure 9:
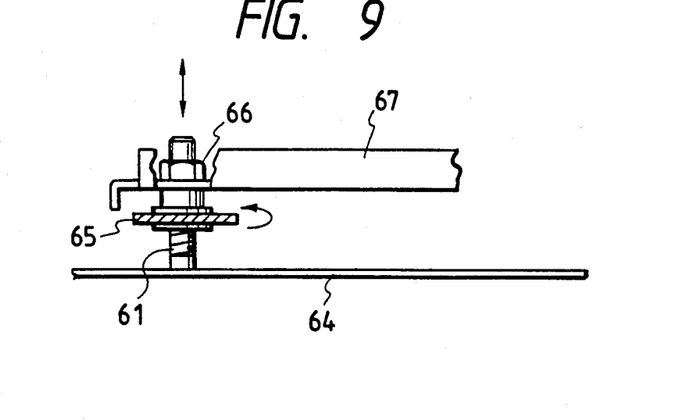
FIG. 9 is a sectional view showing principal part of FIG. 8.

Some means for adjusting the relative positional relationship may be proposed. A method of adjusting the positional relationship on the side of the image forming unit 3 will be explained below with reference to FIGS. 8 and 9. FIG. 8 is a perspective view of the image forming unit 3, and FIG. 9 is a partial enlarged view of FIG. 8. The image forming unit 3 is aligned with a base plate 64 of the image reading apparatus by three pins 61, 62, and 63. The pins 61 to 63 are threaded, and are engaged with adjustment nuts 65 and fixing nuts 66. With these members, a lens support base 67 is fixed and aligned. When the adjustment nut 65 engaged with the pin 61 is rotated, the image forming unit 3 is inclined in a direction of an arrow H in FIG. 8, and adjustment in the synchronism direction described above can be attained. When the adjustment nut (not shown) engaged with the pin 62 or 63 is rotated, the image forming unit 3 is inclined in a direction of an arrow G in FIG. 8, and parallelism adjustment, i.e., right-angle adjustment between the longitudinal direction a of the slit 16 and the longitudinal direction b of the CCD 32, can be attained. Therefore, the adjustment nuts 65 are rotated while observing an adjustment monitor or a predetermined LED output on the operation unit on the market, so that light passing through the superfine portions of the slit 16 can become incident into the slits 52 of the masking members 51 of the CCD 32. Thus, the longitudinal direction a of the slit 16 can almost perfectly coincide with the longitudinal direction b of the CCD 32, and the synchronism and right angle can be easily and precisely adjusted.

As another means for adjusting the relative positional relationship, the full-speed mirror unit 1 or the half-speed mirror unit 2 may be finely adjusted, or a rail (not shown) along which the full-speed mirror unit 1 or the half-speed mirror unit 2 scans may be adjusted. When this embodiment is adopted in these adjustment methods, as described above, adjustment can be easily and precisely realized.

From the viewpoint of maintenance on the market, it is preferable to perform adjustment by moving the full-speed mirror unit 1 arranged near the original table glass 4 rather than adjustment by moving the image forming unit 3 present in the apparatus. In this case, the full-speed mirror unit 1 is arranged to allow right-angle adjustment and synchronism adjustment.

Figure 10:
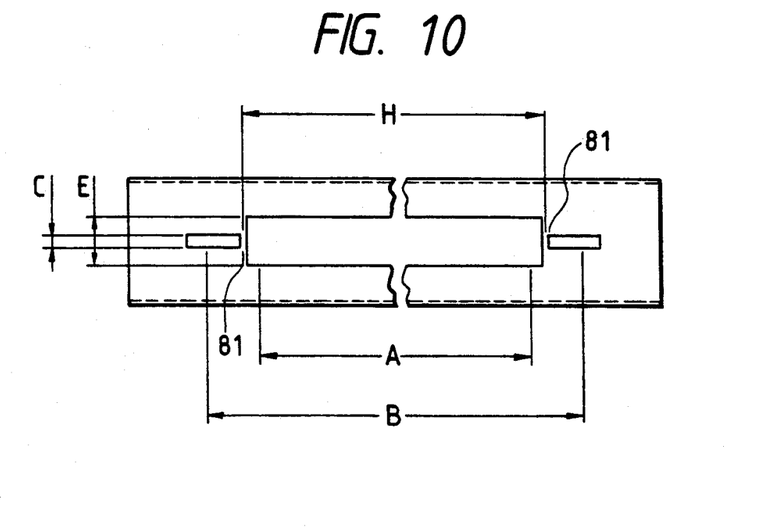
FIG. 10 is a plan view showing the arrangement of a slit of an image reading apparatus according to the second embodiment of the present invention.

FIG. 10 is a plan view showing a slit provided at the original surface side according to the second embodiment of the present invention. In FIG. 10, a slit having a width E is formed in a region having a length exceeding that of an area A corresponding to the maximum image reading width, and superfine slits having a width C are formed outside the slit like in the first embodiment. Non-opening portions 81 are formed at the boundaries between the slit and the superfine slits. With this arrangement, not only the synchronism adjustment and right-angle adjustment can be performed as in the first embodiment, but also if the interval of the non-opening portions 81 is input in advance to a main body CPU, magnification adjustment can be easily and precisely performed by reading the non-light incidence interval of picture elements on the CCD 32 without requiring a special jig on the market.

In the above embodiments, superfine slits are formed on the two end portions of a slit at the original side, and slits are also formed on surplus picture element portions of the CCD. Thus, the slits are caused to correspond with each other upon adjustment so that adjustment process can be simplified and adjustment precision can be improved. However, when the superfine slits are provided to only the slit at the original surface side, it can be confirmed that portions having the width C are projected onto the picture element areas of the CCD with respect to the exposure effective width having the width E in FIG. 5, and an exposure margin of (E−C)/2 can be provided. Therefore, even when the image reading apparatus suffers from a change in durability, other changes over time, a distortion caused by movement of a main body, and the like, the margin of (E−C)/2 can be provided after adjustment, and a sufficient latitude can be assured in adjustment on the market. As shown in FIGS. 6 and 7, when the slits are formed on the surplus picture element portions of the CCD 32, adjustment can be performed to a degree in which an image corresponding to the slit having the width C at the original side is projected at the center of the picture elements on the CCD 32. Therefore, adjustment precision can be further improved.

As described above, according to the present invention, since superfine slit portions having a smaller width in the short-side direction than that of a slit at the original side are formed on the two end portions of the slit, coincidence precision for causing the central lines in the short-side direction of a reading sensor such as a solid-state image pickup element (e.g., a CCD) and the slit at the original side to coincide with each other can be improved. Furthermore, the present invention is particularly effective for color image reading apparatuses disclosed in an apparatus in which the reading position must always be located at the central portion of a slit since the balance of amounts of light incident on three lines largely influences the color balance of a read image like in a color digital reading apparatus which uses a plurality of CCDs such as a 3-line sensor, and color separation means, and in an apparatus, in which reflection light, from a position other than an actually read position, of slit passing light adversely influences reading precision.

As described above, the image reading apparatus according to the present invention has the full-speed mirror unit 1 comprising the illumination lamp 11 and the slit 16. An original on the original table glass 4 is illuminated by the illumination lamp 11, and light reflected by the original is guided to the CCD 32 in the image forming unit 3 through the half-speed mirror unit 2.

A pair of extra slits having a width smaller than the width of the slit 16 in its short-side direction are formed on the two end portions in the longitudinal direction of the slit 16. Light components passing through the extra slits are guided to portions outside the effective image region of the CCD 32, and the positions of optical members of the image reading apparatus are adjusted on the basis of optical information received at these portions.

As the preferred embodiment, slit members having a width smaller than the width of the effective image region in its short-side direction, or masking members are provided to light-receiving picture element regions of a solid-state image pickup element on which light components passing through the extra slits are focused.

According to the present invention, the extra slits are formed on the two end portions of the slit for shielding excessive light, and slits smaller than an effective picture element area are formed on the two end portions of the solid-state image pickup element, so that high-precision right-angle adjustment and synchronism adjustment can be performed without using a special jig.

The third embodiment of an image reading apparatus according to the present invention will be described below.

Figures 11A, 11B:
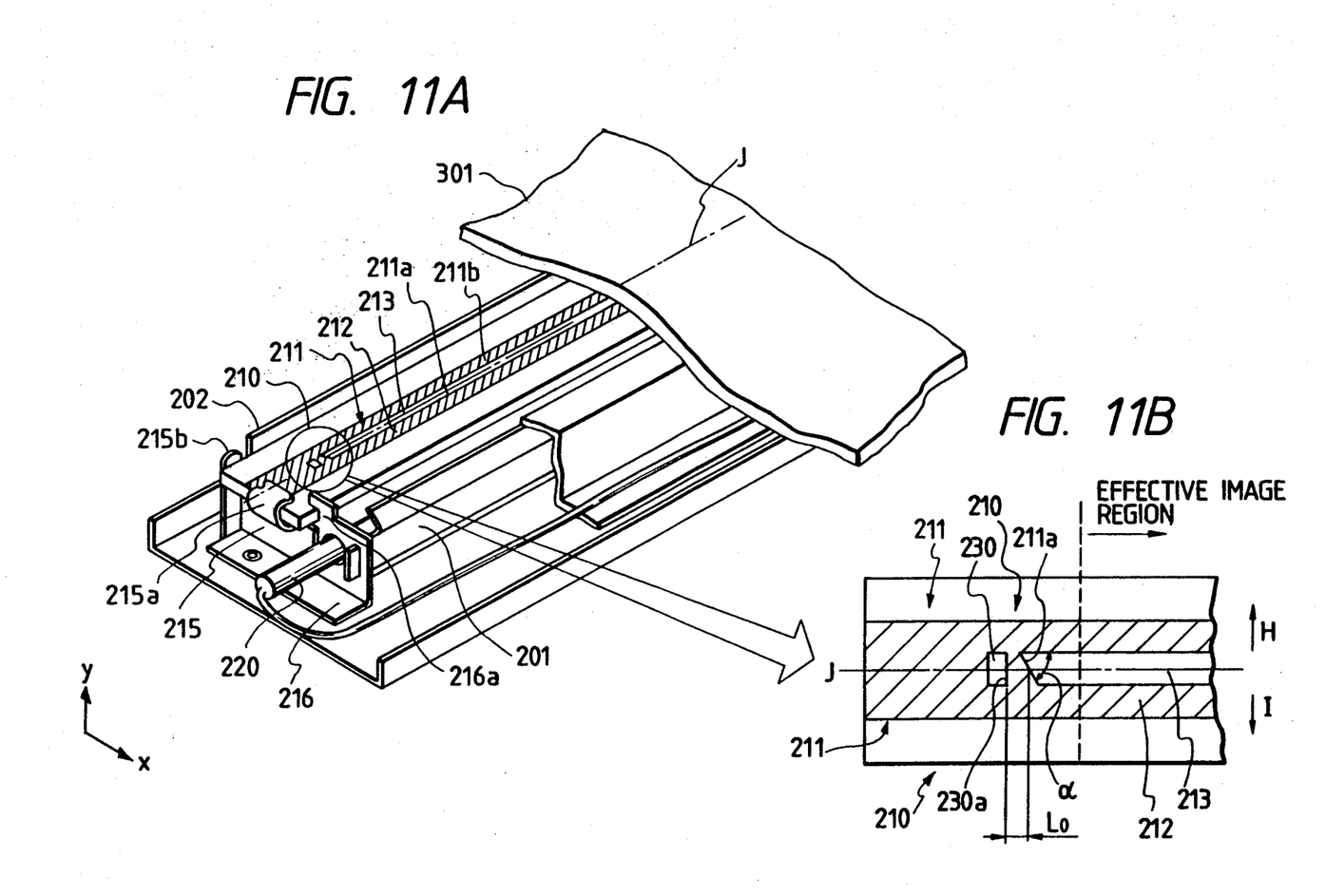
FIG. 11A is a schematic perspective view of a slit and an illumination system of an image reading apparatus according to the third embodiment of the present invention.
FIG. 11B is an enlarged view of principal part of FIG. 11A.
Figure 12A:
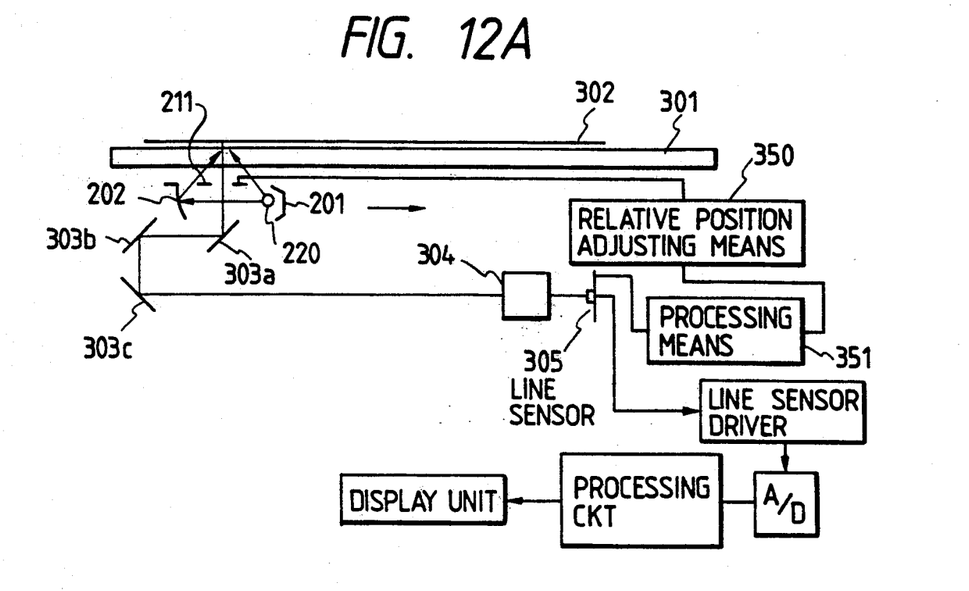
FIG. 12A is a view showing the arrangement of an optical system of the image reading apparatus shown in FIGS. 11A and 11B.

FIGS. 11A and 11B show an illumination system constituted by a slit 211 having a chart opening portion 210 on a portion outside an effective image region of an image reading apparatus of the present invention, a halogen lamp 220 for illuminating an original 302 placed on an original table glass 301, and reflection hats 201 and 202. The slit 211 is supported by support portions 215, 215a, 215b, 216, and 216a. FIG. 12A is a schematic view of the overall image reading scanning system. In FIG. 12A, an image of the original 302 illuminated by the halogen lamp 220 is focused on a line sensor 305 by a focusing lens 304 through scanning mirrors 303a, 303b, and 303c. FIG. 12A also schematically illustrates the flow of a line sensor output obtained from the chart opening portion 210 of the slit 211.

The present invention will be described in detail below. In a factory, optical adjustment is performed using a special-purpose jig, and the relative positional relationship is adjusted by a relative position adjusting means 350, so that the line sensor 305 can read a center J of the slit 211. However, on the market, as described above, the relative positional relationship between the slit 211 and the line sensor 305 is shifted due to a vibration or fall during transportation or poor flatness of a plane of a place where the image reading apparatus is placed, and the reading position of the line sensor 305 is shifted from the slit center J shown in FIG. 11B in a direction of an arrow H or I. On the market, there is no means for detecting the shift.

Thus, according to the present invention, as shown in FIG. 11B, the chart opening portions are formed at the two end portions (only one side is illustrated in FIG. 11B) of the slit to incline the ends of a slit opening 213, and rectangular opening portions 230 are formed on the two end portions of a light-shielding portion 212. The relative positional relationship between the slit 211 and the line sensor 305 can be detected based on line sensor outputs corresponding to the opening portions 230.

Figure 12B:
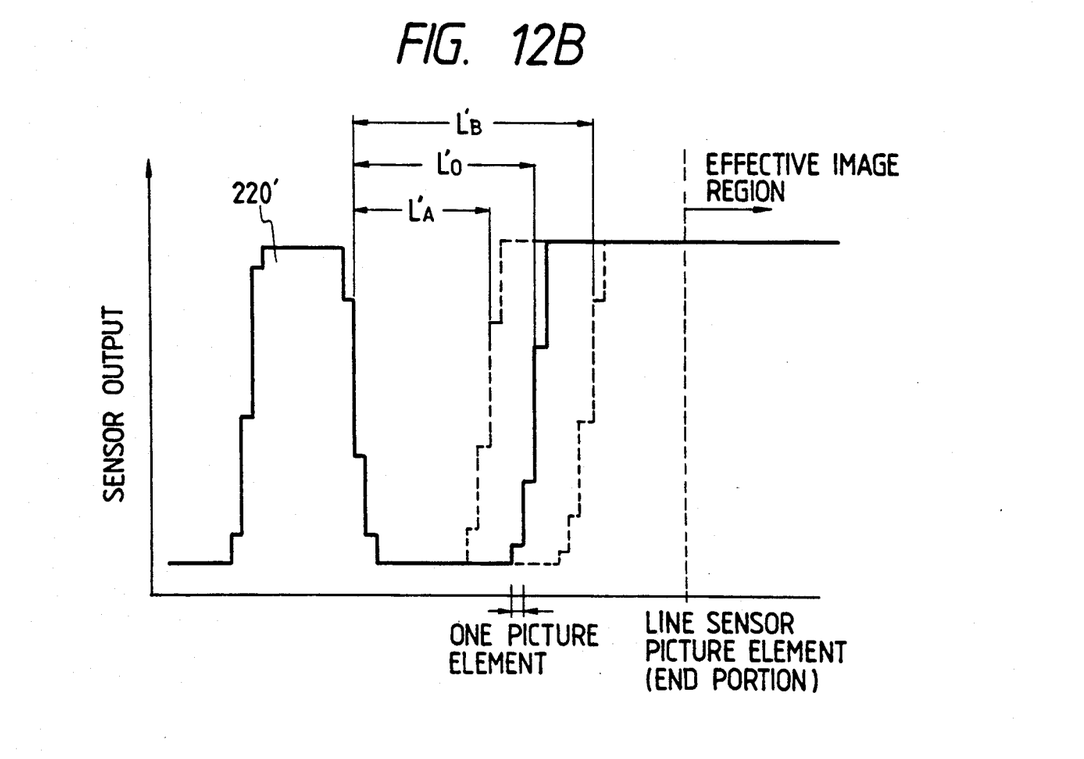
FIG. 12B is an explanatory view of a line sensor output near a chart opening portion of the apparatus.

An operation upon execution of the detection will be described below. The halogen lamp 220 illuminates an original such as blank paper or a shading plate, so that a line sensor output from the original or the shading plate can be obtained. At this time, the line sensor output corresponding to the chart opening portions 210 at the two ends of the slit is as shown in FIG. 12B. When the line sensor 305 reads the slit center J, the interval between an edge 230a of the rectangular opening portion 230 formed at the end portion of the slit 211 and an oblique slit edge 211a becomes $L_O$, and the line sensor output corresponding to this interval is obtained from $L_O'$ picture elements. When the line sensor 305 reads a position shifted from the slit center J in the direction of the arrow H, the line sensor output corresponding to the interval between the edge 230a of the rectangular opening portion 230 and the oblique slit edge 211a is obtained from $L_A'$ picture elements ($L_A' < L_O$). On the contrary, when the line sensor 305 reads a position shifted from the slit center J in the direction of the arrow I, the line sensor output corresponding to the interval between the edge 230a of the rectangular opening portion 230 and the oblique slit edge 211a is obtained from $L_B'$ picture elements ($L_B' > L_O$). Based on the above facts, when L' picture elements corresponding to the output interval between the edge 230a of the opening portion 230 and the oblique slit edge of the line sensor output obtained from the chart opening portion 210 at each end of the slit are compared with the center value $L_O'$ by a processing means 351, the shift direction (H or I) of the line sensor with respect to the slit can be detected.

Figure 13:
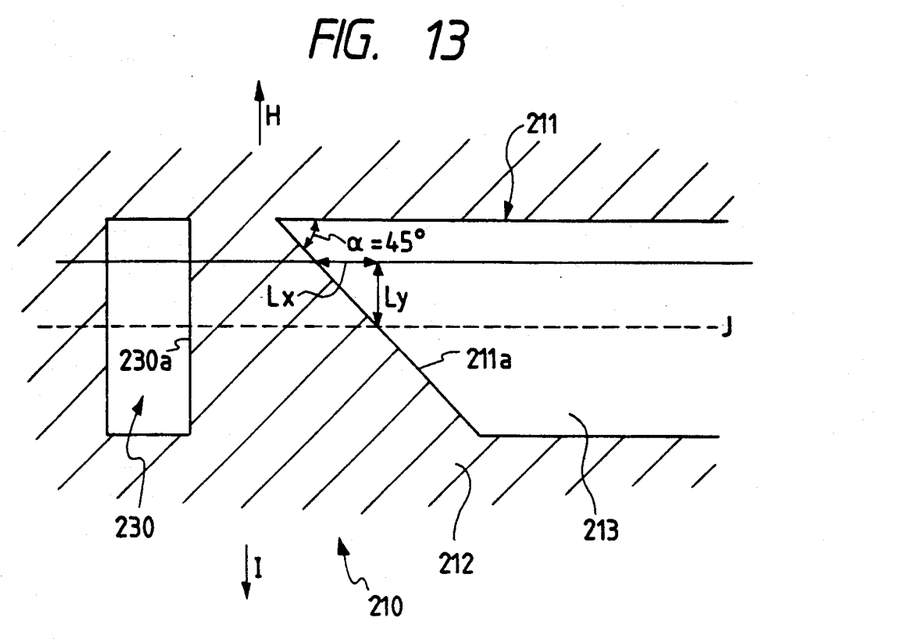
FIG. 13 is a view showing a state when the inclination angle of a slit edge of the chart opening portion of the apparatus shown in FIGS. 11A and 11B is set to be 45°.

When the inclination angle of the slit edge 211a is determined, not only the shift direction but also the shift amount can also be detected. For example, if an inclination angle α of the slit edge is set to be 45°, since $L_x = L_y$, a shift amount in the subscanning direction (the direction of the arrow H or I), and a shift amount ($L - L_O$) in the main scanning direction have a relationship of 1:1 therebetween. Assuming that the reading density of an original is 400 dpi (63.5 μm per picture element), if $L' - L_O' = +2$ picture elements is obtained as a difference between the L' picture elements obtained from the sensor output and $L_O'$ picture elements as the center value, it can be detected that the line sensor reads a position shifted from the slit center J in the direction of the arrow I by 0.127 mm.

The slit 211 used in the present invention can be manufactured by performing silk-screen printing on glass. On the basis of the detection result of the relative positional relationship between the slit 211 and the line sensor 305 obtained according to the present invention, legs on which the main body of the image reading apparatus is installed or a focusing unit described in the first embodiment can be adjusted. Thus, the relative positional relationship between the slit and the line sensor can be re-adjusted with high precision on the market.

The present invention is particularly effective for a color image reading apparatus using a plurality of line sensors and a color separation means. When a method of detecting a shift by monitoring the light amount distribution of the line sensor is combined with the present invention, the shift can be detected even when the reading position of the line sensor 305 is considerably shifted, and falls outside the slit width.

Figure 14:
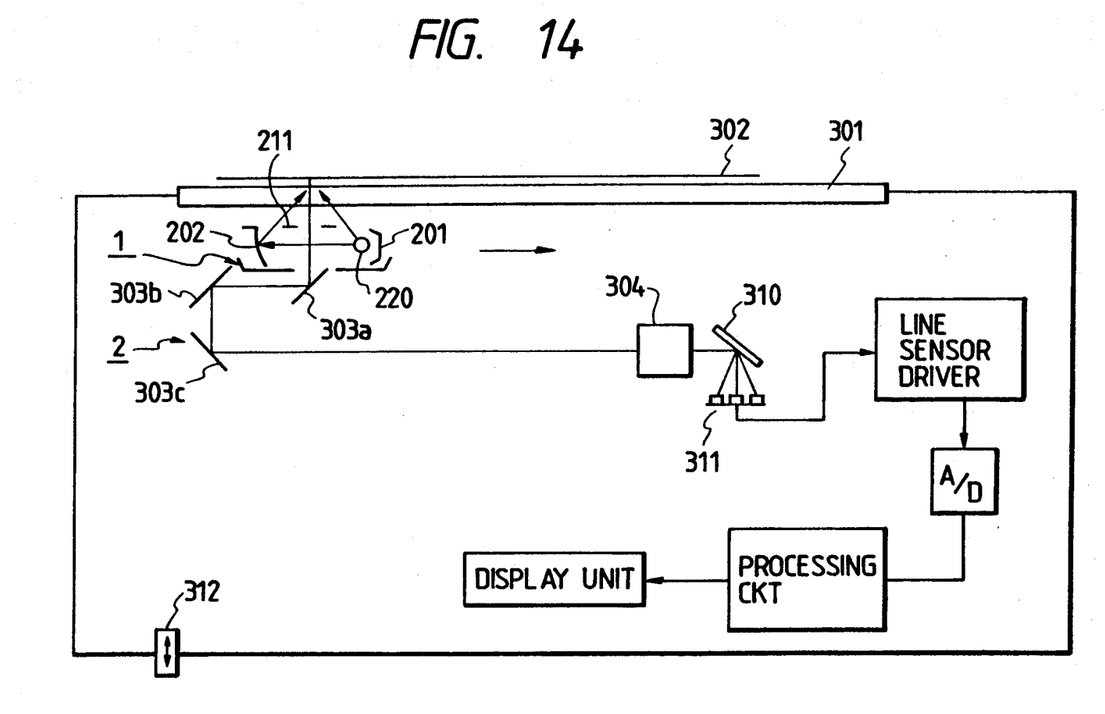
FIG. 14 is a schematic view of a color image reading apparatus according to the fourth embodiment of the present invention.

The present invention is also effective in the following apparatus. In this apparatus, as shown in FIG. 14, an image on an original 302 illuminated by a halogen lamp 220 is formed on the surface of a light-receiving means, in which three line sensors 311 are arranged on a single substrate surface to be parallel to the extending direction of the slit, through a color separation means 310 for separating light incident on a focusing optical system 304 through a slit 211 into three color light components in a direction perpendicular to the slit. The light-receiving means reads a color image. In FIG. 14, the same reference numerals denote the same parts as those in the apparatus shown in FIG. 11, and a detailed description thereof will be omitted.

In the apparatus shown in FIG. 14, for the purpose of maintenance on the market, a full-speed mirror unit 1 is arranged to allow right-angle adjustment and synchronism adjustment, and legs 312 on which the apparatus main body is installed are vertically adjustable. When the legs 312 are vertically adjusted, a rail along which a half-speed mirror unit 2 scans is displaced, and consequently, synchronism adjustment can be realized.

In the apparatus shown in FIG. 14, the three line sensors 311 are arranged to be parallel to the extending direction of the slit 211, and receive a plurality of color light components (R, G, and B).

The adjustment of the present invention has been described about only the two end portions of the slit. However, since the slit and the line sensor linearly extend, if the relative positional relationship between the slit and the line sensor can be adjusted at the two end portions, the relative positional relationship between the slit and the line sensor can automatically be adjusted at the central portion.

As described above, according to the present invention, the image reading apparatus having the slit 211 for focusing an image onto the line sensor 305 is characterized by having the chart opening portions 210 in each of which a longitudinal distance between the edge 230a of the opening portion, formed at each end portion outside the effective image region in the longitudinal direction of the slit 211, and the slit edge 211a of the slit 211 varies in the widthwise direction.

It is preferable that the apparatus has the chart opening portions in each of which the longitudinal distance between the edge of the opening portion and the slit edge varies in the widthwise direction, and the longitudinal distances at respective positions in the widthwise direction are predetermined.

It is also preferable that the apparatus has a processing means for processing output information obtained from the chart opening portions.

It is also preferable that the apparatus has a relative position adjusting means for adjusting the relative positional relationship between the slit and the line sensor according to the processing result from the processing means.

As described above, according to the present invention, since the longitudinal direction between the edge of the opening portion and the slit edge varies in the widthwise direction, if the line sensor is shifted in the widthwise direction, the longitudinal distance to be read is changed, and it can be detected that the line sensor position is shifted.

When the longitudinal distances at the respective positions in the widthwise direction are predetermined, the inclination of the line sensor in the widthwise direction can be detected based on the read longitudinal distance.

Thus, the relative positional relationship between the slit and the line sensor can be maintained with high precision even on the market.

In the color image reading apparatus shown in FIG. 14, color image information on an original surface is focused on the surface of a light-receiving means comprising, e.g., three line sensors (CCDs), through optical members such as a focusing lens, a diffraction grating as a color separation means, and the like, and is digitally read by utilizing output signals from the line sensors at that time.

In this color image reading apparatus, in order to prevent a light beam from an original surface different from the original surface to be read from becoming incident on the line sensor surface as noise light, a slit having an opening portion elongated in a direction same as the aligning direction of picture elements forming the line sensors is arranged near the original surface. When the apparatus is assembled, the relative positional relationship between the slit and the line sensors is adjusted.

In a color image reading apparatus, in a so-called monolithic 3-line sensor, in which three line sensors as light-receiving means are arranged on a single substrate, the interval between the adjacent lines is generally set to be as small as 100 to 200 $\mu$m. In correspondence with this interval, the above-mentioned slit also has a considerably narrow opening pattern having an opening width as small as 1 to 2 mm.

For this reason, in order to read a color image with high precision by utilizing the output signals from the light-receiving means, the relative positional relationship between the slit and the 3-line sensor must be adjusted with high precision.

In general, this adjustment is performed when the color image reading apparatus is assembled. More specifically, the adjustment is performed with high precision using, e.g., optical adjustment jigs in a well-equipped factory.

However, when a color image reading apparatus is installed and used on the market, the installation place may have poor flatness, and may be inclined, resulting in poor installation conditions.

When the apparatus is installed on such a place, for example, the overall apparatus is distorted, and the relative positional relationship between the slit and the 3-line sensor is shifted. As a result, color image reading precision may be deteriorated.

In particular, when a light beam from a color image is separated into three color light components R (red), G (green), and B (blue) by a color separation means, and the color image is read on the basis of the three color light components, it becomes very difficult to digitally read the color image with good balance and high precision using the color light components.

A color image reading apparatus of the present invention to be described below has as its object to provide a color image reading apparatus having a position adjusting means, wherein a shift in relative positional relationship between a slit and a light-receiving means caused by, e.g., a poor installation condition of the color image reading apparatus is corrected by utilizing the position adjusting means, thereby reading a color image with high precision.

A color image reading apparatus having the position adjusting means of the present invention to be described in the following embodiment is characterized in that a color image on an original surface illuminated with an illumination means is formed on the surface of a light-receiving means in which three line sensors are arranged on a single substrate to extend in a direction parallel to the extending direction of a slit through a color separation means for color-separating incident light from a focusing optical system through the slit into three color light components in a direction perpendicular to the slit, when the color image is read by the light-receiving means, an original having a uniform density and placed on the original surface is read by the light-receiving means, the original information is displayed on a display means, and the relative positional relationship between the slit and the light-receiving means is adjusted by a position adjusting means by utilizing the original information displayed on the display means.

In particular, the position adjusting means is characterized by adjusting the installation position when the color image reading apparatus is installed, or automatically adjusting the position of the color image reading apparatus on the basis of signals from the light-receiving means.

Figure 15:
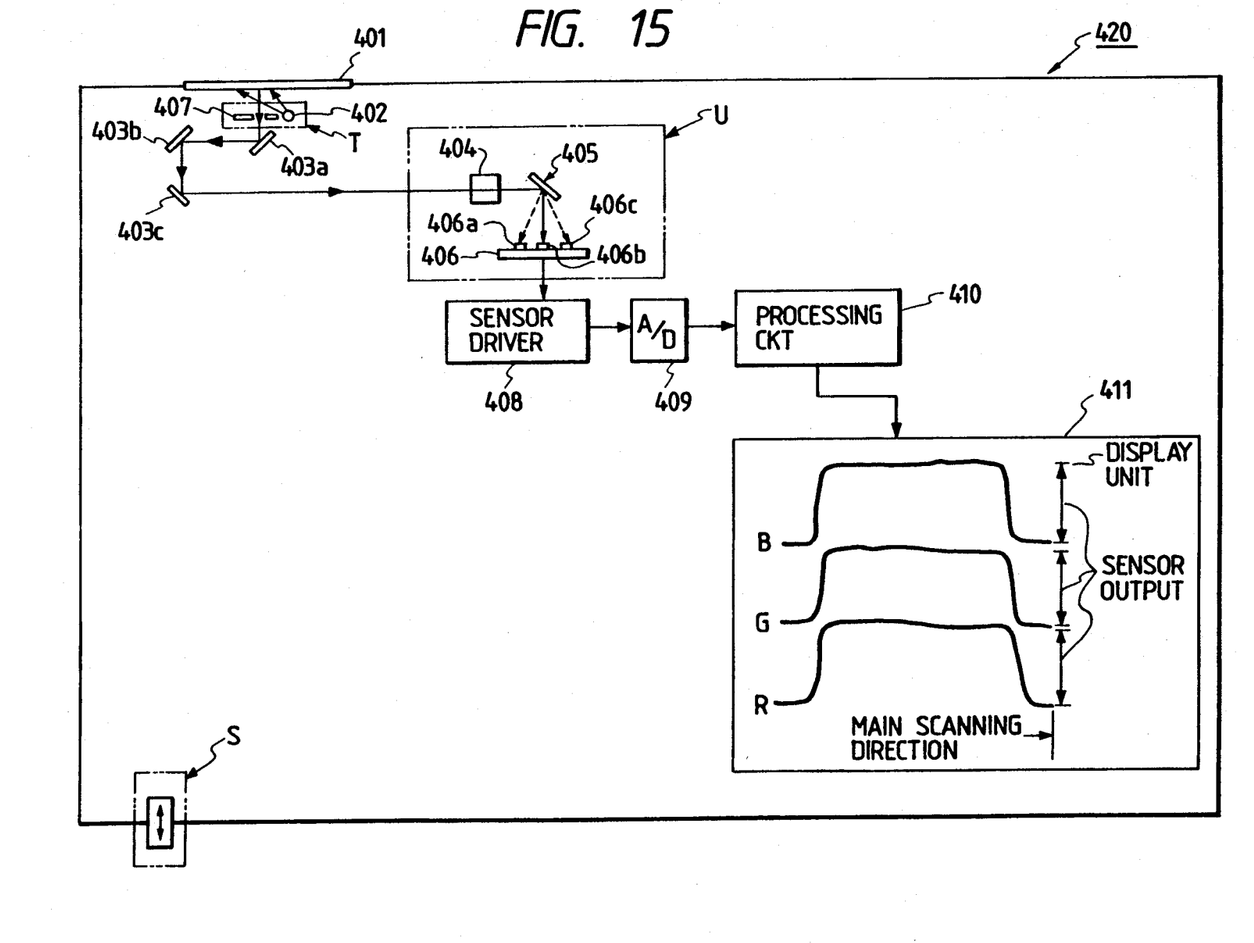
FIG. 15 is a schematic view showing principal part of a color image reading apparatus having a position adjustment means according to the fifth embodiment of the present invention.

FIG. 15 is a schematic diagram showing the fifth embodiment of a color image reading apparatus having a position adjusting means according to the present invention.

In FIG. 15, the color image reading apparatus has an original surface 401, on which a color image original is normally placed, and a color image is read, an illumination means 402 comprising, e.g., a halogen lamp, a fluorescent lamp, or the like, and a slit 407 having an opening portion elongated in a direction (main scanning direction) perpendicular to the drawing surface as the aligning direction of picture elements of a 3-line sensor 406 as a light-receiving means (to be described later), and arranged near the original surface 401. The slit 407 specifies its opening pattern and position to be able to prevent a light beam from a different region on the original surface 401 from the original surface 401 to be read in the subscanning direction from becoming incident on the surface of the 3-line sensor 406 as noise light.

The apparatus also has optical path deflection mirrors 403a, 403b, and 403c for guiding a light beam reflected by the original surface 401 toward a focusing lens 404 (to be described below). The focusing lens 404 focuses a light beam based on an original (color image) onto the surface of the 3-line sensor 406 through a color separation means 405.

The color separation means 405 comprises a diffraction grating, and color-separates a light beam from the focusing lens 404 into color light components of primary colors R (red), G (green), and B (blue). The light-receiving means 406 comprises a so-called monolithic 3-line sensor in which three line sensors 406a, 406b, and 406c are arranged on a single substrate surface to be parallel to the main scanning direction.

The apparatus further has a sensor driver 408, an A/D converter 409, and a processing circuit 410. The processing circuit 410 processes digital signals corresponding to the line sensors 406a, 406b, and 406c converted by the A/D converter 409, and inputs the processed signals to a display unit 411 (to be described below). The display unit 411 as a display means comprises a liquid crystal display, and displays data in units of the line sensors 406a, 406b, and 406c on the basis of output information from the processing circuit 410.

More specifically, according to this embodiment, as will be described later, for example, a normal blank sheet having a uniform density is placed on the original surface 401, and the output signals from the line sensors 406a, 406b, and 406c corresponding to R, G, and B color light components are processed through the sensor driver 408, the A/D converter 409, and the processing circuit 410. The processed output signals are displayed on the display unit 411 as output waveforms corresponding to the line sensors 406a, 406b, and 406c.

Based on the output waveform patterns at that time, assembling precision of the overall apparatus, e.g., an error of the relative positional relationship between the slit 407 and the 3-line sensor 406, i.e., whether or not the positional state of the overall apparatus installed on the market is normal, is confirmed.

More specifically, assume that when the apparatus of this embodiment is installed on a use place, the installation place has good flatness, and the relative positional relationship between the slit 407 and the 3-line sensor 406 is normally adjusted. In this case, if an original having a uniform density is placed on the original surface 401, when a light beam from the original surface 401 is focused on the surface of the 3-line sensor 406 through an optical system having the slit 407, the focusing lens 404, and the like, the line sensors 406a, 406b, and 406c corresponding to R, G, and B color light components can form the same line images in the subscanning direction.

Figure 16:
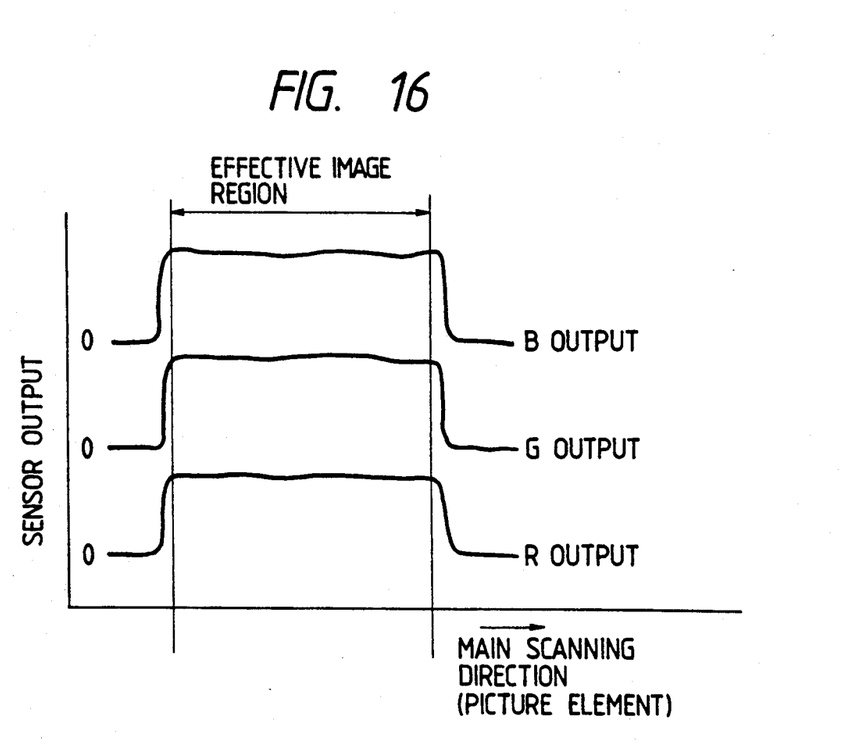
FIG. 16 is an explanatory view showing a normal output waveform from a line sensor.

Therefore, substantially the same waveforms in the main scanning direction can be obtained, as shown in FIG. 16, as the output signals from the line sensors 406a, 406b, and 406c corresponding to R, G, and B color light components, i.e., output waveforms. According to these waveforms, a color image can be digitally read with high precision.

Figure 17A:
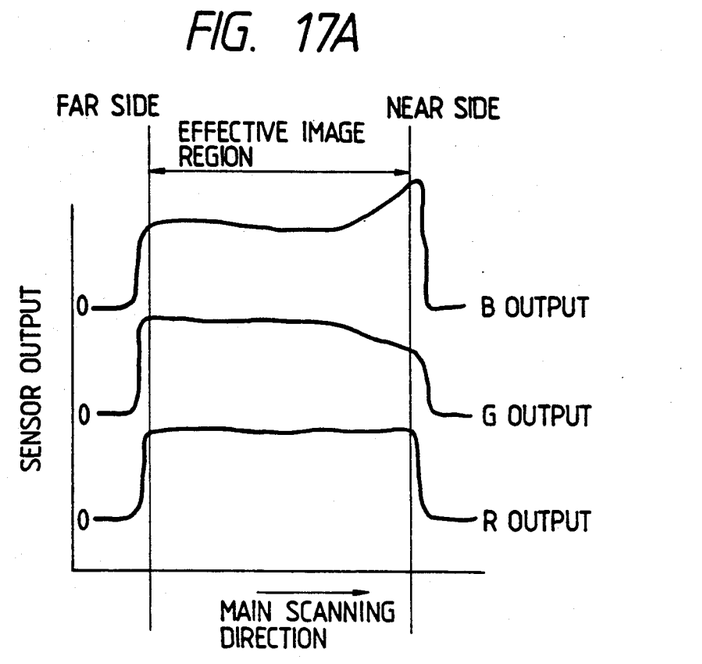
FIGS. 17A and 17B are explanatory views showing abnormal output waveforms from the line sensor.
Figure 17B:
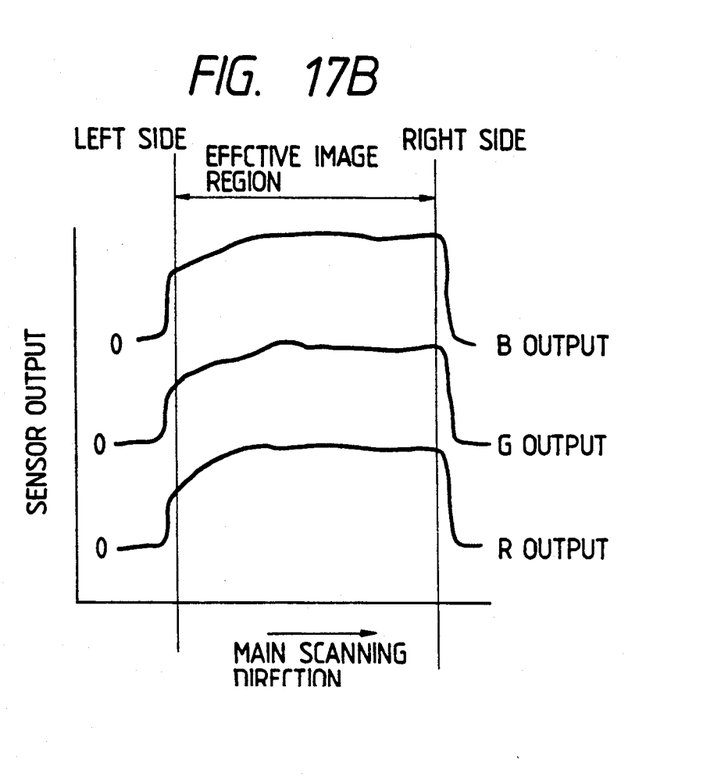

In contrast to this, when the installation place is inclined and has poor flatness, and the relative positional relationship between the slit and the 3-line sensor is shifted, the output signals from the three line sensors 406a, 406b, and 406c corresponding to R, G, and B color light components, i.e., the output waveforms appear to have different patterns, as shown in FIGS. 17A and 17B.

For example, when the apparatus is installed, and is not balanced between the near and far sides of the apparatus, some light components of G color light are incident on the line sensor surface corresponding to B color light at the near side of the apparatus, and the output signal from the line sensor corresponding to the B color light is increased from a reference output signal (output level for reading a color image) at the near side of the apparatus. Contrary to this, the output signal from the line sensor corresponding to the G color light is decreased from the reference output signal, resulting in nonuniform output waveforms.

When the apparatus is installed, and is not balanced in the right-and-left direction, an eclipse caused by the slit occurs, and the output signals from the line sensors are decreased from the reference output signal at the left side of the apparatus, as shown in FIG. 17B, resulting in nonuniform output waveforms.

More specifically, the waveforms of the output signals from the 3-line sensor vary depending on the installation conditions of the apparatus. For this reason, the output signals from the 3-line sensor are displayed on the display unit, and are adjusted by utilizing the signals displayed on the display unit, thereby adjusting the positional relationship between the slit and the 3-line sensor. Thus, the respective elements are satisfactorily adjusted, and a color image can be read with high precision.

In this manner, according to this embodiment, the output waveforms as the output signals from the line sensors 406a, 406b, and 406c are displayed on the display unit 411, thereby confirming whether or not the relative positional relationship between the slit 407 and the 3-line sensor 406 is normal. When an abnormality is found in the output waveforms displayed on the display unit 411, the shift in the relative positional relationship between the slit 407 and the 3-line sensor 406 is adjusted by a position adjusting means (to be described later) while observing the output waveforms.

The position adjusting means according to this embodiment utilizes a plurality of legs (corresponding to an installation surface) for supporting the apparatus like in the apparatus described above with reference to FIG. 14, and the height of each leg is desirably adjustable. When the heights of the legs are properly adjusted, the position of the apparatus is adjusted, thereby correcting the shift in the relative positional relationship between the slit 407 and the 3-line sensor 406.

In this manner, according to this embodiment, even when a shift in the relative positional relationship between the slit and the 3-line sensor occurs due to the installation place of the apparatus, the shift in the relative positional relationship can be easily re-adjusted by using the above-mentioned method. Thus, a color image can be digitally read with high precision on any installation place.

In this embodiment, a normal white paper sheet is used as an original having a uniform density. However, the present invention is not limited to this as long as an original has a uniform density.

In this embodiment, the liquid crystal display is used as the display unit. However, the present invention is not limited to this, and any other display devices may be used.

A method of acquiring the output signals from the 3-line sensor as the light-receiving means used in the embodiment of the present invention will be explained below.

In general, in a display unit such as a liquid crystal display, the numbers of picture elements in the vertical (V) and horizontal (H) directions of the display unit are designed to be considerably smaller than the number of picture elements of the line sensors. For this reason, direct display of output signals from, e.g., thousands of picture elements forming the line sensors is practically limited.

In general, even when output signals are obtained by selecting an arbitrary number of picture elements from the thousands of picture elements forming the line sensors, this presents no serious problem upon decision of whether the output waveforms from the line sensors displayed on the display unit are normal or abnormal.

Thus, in this embodiment, when the output signals from the line sensors corresponding to R, G, and B color light components, i.e., output waveforms are displayed on the display unit, the numbers of output signals obtained from the line sensors are set to be arbitrary values to display the waveforms.

More specifically, in this embodiment, an arbitrary number of picture elements of the thousands of picture elements forming the line sensors are selected every five or ten picture elements, the output signals from the selected picture elements are processed by the processing circuit, and the processed signals are displayed on the display unit.

The relative positional relationship between the slit and the 3-line sensor is adjusted by the above-mentioned position adjusting means while observing the output signals from the 3-line sensor, i.e., the output waveforms displayed on the display unit.

A display method of the display unit as the display means used in the embodiment of the present invention will be described below.

In each embodiment described above, the output waveforms from the 3-line sensor are directly displayed on the display unit, and an operator himself or herself judges whether or not the output waveforms are normal. Then, the operator adjusts the relative positional relationship between the slit and the 3-line sensor by the above-mentioned position adjusting means.

In this embodiment, a judgment means for judging whether or not the output waveforms from the 3-line sensor are normal is arranged on the apparatus, and the content of the processing result from the judgment means is displayed on the display unit as message information (judgment result information).

For example, as the message information, a message "normal positional state", "abnormal positional state. adjust heights of legs", or the like is displayed, so that an operator can adjust the positional state of the overall apparatus according to the message information.

A method of automatically controlling the position adjusting means used in the embodiment of the present invention will be explained below.

In the above embodiment, the judgment result obtained by the judgment means is displayed on the display means as the message information, and an operator manually adjusts the heights of the plurality of legs defining the installation plane of the apparatus using the position adjusting means on the basis of the output information.

In this embodiment, a drive mechanism utilizing, e.g., a motor, and capable of automatically adjusting the height of a leg is assembled in each leg portion, and the motors are automatically driven to adjust the heights of the legs when an abnormal state is determined based on an information signal obtained by the judgment means. Thus, a shift in the relative positional relationship between the slit and the 3-line sensor can be corrected.

Another means different from the position adjusting method for adjusting the height of the apparatus as described above will be described below as another embodiment of the present invention.

In the above embodiment, in order to correct the flatness of the installation plane of the apparatus, a plurality of legs supporting the apparatus are utilized as the position adjusting means, i.e., the heights of these legs are properly adjusted so that a shift in the relative positional relationship between the slit and the 3-line sensor is corrected.

In this embodiment, in addition to the adjusting method (S) by means of the heights of the legs, as shown in FIG. 15, a method (T) of directly adjusting the mounting position of the slit fixed in an apparatus 420 by a driving means, a method (U) of adjusting the heights of the mounting positions of the optical members (such as lenses) constituting the optical system, or the like is employed to correct an error caused by the positional state of the overall apparatus.

In this manner, the mounting positions or the heights of the mounting positions of the optical members can be properly adjusted to obtain the same effect as in the above embodiments.

According to the present invention, as described above, the output waveforms from the 3-line sensor are displayed on the display means on the basis of position information of the overall apparatus, and the relative positional relationship between the slit and the light-receiving means comprising the line sensors is adjusted by the position adjusting means using the information signal from the display means. Thus, a shift in the relative positional relationship between the slit and the light-receiving means caused by the poor flatness of the installation place of the apparatus can be easily adjusted. As a result, the color image reading apparatus having the position adjusting means and capable of reading a color image with high precision can be realized.

As described above, according to the present invention, a color image on the original surface 401 illuminated with the illumination means 402 is formed on the surface of the light-receiving means 406 in which the three line sensors 406a, 406b, and 406c are arranged on a single substrate to extend in a direction parallel to the extending direction of the slit 407 through the color separation means 405 for color-separating incident light from the focusing optical system 404 through the slit 407 into three color light components in a direction perpendicular to the slit 407. When the color image is read by the light-receiving means 406, an original having a uniform density and placed on the original surface 401 is read by the light-receiving means 406, the original information is displayed on the display means 411, and the relative positional relationship between the slit 407 and the light-receiving means 406 is adjusted by the position adjusting means by utilizing the original information displayed on the display means 411.

It is preferable that the color image reading apparatus has the judgment means for judging based on output information from the light-receiving means whether or not the positional state of the overall apparatus is normal, and the display means displays the judgment result information using the output information from the judgment means.

It is also preferable that the position adjusting means is automatically controlled on the basis of the output information from the judgment means.

It is further preferable that the position adjusting means adjusts the installation position when the color image reading apparatus is installed.

It is also preferable that the position adjusting means automatically adjusts the position of the color image reading apparatus on the basis of the signals from the light-receiving means.

What is claimed is:

1. An image reading apparatus comprising:
   a line sensor;
   an image forming optical system for forming an image of an object on said line sensor; and
   a slit member disposed in an optical path between the object and said image forming optical system, said slit member having a slit and having opening portions at both end portions of said slit in a longitudinal direction thereof, said opening portions corresponding to portions outside an effective image region of said line sensor, and said opening portions being provided for detecting a shift in a relative positional relationship between said slit and said line sensor.

2. An apparatus according to claim 1, further comprising means for performing adjustment of said apparatus by moving said slit member on the basis of a result obtained by detecting light passing through the opening portions by said line sensor.

3. An apparatus according to claim 1, wherein said image forming optical system and said line sensor are constituted as a single unit.

4. An apparatus according to claim 3, further comprising means for performing adjustment of said apparatus by moving said unit on the basis of a result obtained by detecting light passing through the opening portions by said line sensor.

5. An apparatus according to claim 1, further comprising means for performing adjustment of said apparatus by moving the overall apparatus on the basis of a result obtained by detecting light passing through the opening portions by said line sensor.

6. An apparatus according to claim 1, wherein a width of each of said opening portions is smaller than a width of said slit in a direction of a shorter side of said slit.

7. An apparatus according to claim 1, wherein a non-opening portion is provided at a boundary between said slit and at least one of said opening portions.

8. An apparatus according to claim 1, wherein opposite ends of said slit in the longitudinal direction thereof have edges which are not parallel to edges of said opening portions.

9. An apparatus according to claim 1, further comprising masking members arranged on both end portions of said line sensor in the longitudinal direction thereof.

10. An apparatus according to claim 9, wherein each of said masking members comprises a slit having a width which is smaller than a width of the effective image region of said line sensor in a direction of a shorter side thereof.

11. An apparatus according to claim 1, wherein said line sensor comprises a plurality of reading picture elements.

12. An image reading apparatus comprising:
a line sensor;
an image forming optical system for forming an image of an object on said line sensor; and
a slit member disposed in an optical path between the object and said image forming optical system, said slit member having a slit and having opening portions at opposite end portions of said slit in a longitudinal direction thereof, said opening portions corresponding to portions outside an effective image region of said line sensor.

13. An apparatus according to claim 12, further comprising means for performing adjustment of said apparatus by moving said slit member on the basis of a result obtained by detecting light passing through said opening portions by said line sensor.

14. An apparatus according to claim 12, wherein said image forming optical system and said line sensor are constituted as a single unit.

15. An apparatus according to claim 14, further comprising means for performing adjustment of said apparatus by moving said unit on the basis of a result obtained by detecting light passing through said opening portions by said line sensor.

16. An apparatus according to claim 12, further comprising means for performing adjustment of said apparatus by moving the overall apparatus on the basis of a result obtained by detecting light passing through said opening portions by said line sensor.

17. An apparatus according to claim 12, wherein a width of each of said opening portions is smaller than a width of said slit in a direction of a shorter side of said slit.

18. An apparatus according to claim 12, wherein a non-opening portion is provided at a boundary between said slit and at least one of said opening portions.

19. An apparatus according to claim 18, wherein opposite ends of said slit in the longitudinal direction thereof have edges which are not parallel to edges of said opening portions.

20. An apparatus according to claim 12, further comprising masking members provided on both end portions of said line sensor in the longitudinal direction thereof.

21. An apparatus according to claim 20, wherein each of said masking members comprises a slit having a width which is smaller than a width of the effective image region of said line sensor in a direction of a shorter side thereof.

22. An apparatus according to claim 12, wherein said line sensor comprises a plurality of reading picture elements.

* * * * *

UNITED STATES PATENT AND TRADEMARK OFFICE
CERTIFICATE OF CORRECTION

PATENT NO. : 5,283,698
DATED : February 1, 1994
INVENTOR(S) : NOBUMASA FUKUZAWA ET AL.

It is certified that error appears in the above-indentified patent and that said Letters Patent is hereby corrected as shown below:

COLUMN 1

Line 9, "to" (second occurrence) should be deleted.

COLUMN 3

Line 55, "CCD, 32," should read --CCD 32,--.

Signed and Sealed this

Twenty-seventh Day of December, 1994

Attest:

BRUCE LEHMAN

Attesting Officer          Commissioner of Patents and Trademarks